United States Patent [19]
Shachar

[11] Patent Number: 6,081,842
[45] Date of Patent: *Jun. 27, 2000

[54] METHOD AND APPARATUS FOR ENCODING AND USING NETWORK RESOURCE LOCATORS

[75] Inventor: Yuval Shachar, Herzlia, Israel

[73] Assignee: National Semiconductor Corporation, Santa Clara, Calif.

[ * ] Notice: This patent is subject to a terminal disclaimer.

[21] Appl. No.: 09/040,645

[22] Filed: Mar. 17, 1998

Related U.S. Application Data

[63] Continuation of application No. 08/626,601, Apr. 2, 1996, Pat. No. 5,764,910.

[51] Int. Cl.[7] .............................. G06F 12/02; G06F 13/14; G06F 13/42
[52] U.S. Cl. ............................ 709/229; 709/228; 707/10
[58] Field of Search ................................ 709/219, 222.3, 709/218, 228, 229, 206, 217; 379/221; 370/352, 401; 705/9, 8; 707/500, 517, 10; 704/2

[56] References Cited

U.S. PATENT DOCUMENTS

| | | | |
|---|---|---|---|
| 5,339,358 | 8/1994 | Danish et al. | 379/368 |
| 5,388,154 | 2/1995 | Solomon | 379/368 |
| 5,392,338 | 2/1995 | Danish et al. | 399/97 |
| 5,490,088 | 2/1996 | Landis et al. | 709/237 |
| 5,502,725 | 3/1996 | Pohjakallio | 370/94.1 |
| 5,560,005 | 9/1996 | Hoover et al. | 701/10 |
| 5,671,354 | 9/1997 | Ito et al. | 713/201 |
| 5,764,906 | 6/1998 | Edelstein et al. | 709/219 |
| 5,764,910 | 6/1998 | Shalhar | 709/223 |

OTHER PUBLICATIONS

P. Dasgupta, "Resource Location in Very Large Networks," Proceedings of the First International Workshop on Services in Distributed and Networked Environments, pp. 156–163 (1994).

*Primary Examiner*—Daniel H. Pan
*Attorney, Agent, or Firm*—Limbach & Limbach L.L.P.

[57] ABSTRACT

Access to data resources on data communications networks is simplified by encoding data resource specifiers into a compressed form which can be stored in a service providers telephone equipment and transmitted to a user. The service provider stores information objects (e.g., hypertext pages) on one or more host computers at a node of a computer network, and develops compressed, compact resource specifiers for the information objects. A translation of the compressed resource specifier is provided in the user's telephone/terminal device and/or the host computer for translating the compressed resource specifiers back into their uncompressed form. The service provider stores the compressed resource specifiers in his telephone equipment and transmits them to users in response to user requests, such as in DTMF format. A compatible telephone/terminal device at the user's site (e.g., a computer or smartphone) receives and stores the compressed resource specifiers. Subsequently, during a data communication session with the host computer the user can request the specified information objects by transmitting the resource specifier it received from the service provider. The host computer uses the resource specifier it receives from the user to retrieve the requested information and transmit it to the user. This technique eliminates problems associated with memorization, incorrect copying, and/or re-keying of full network resource specifiers.

14 Claims, 5 Drawing Sheets

METHOD AND APPARATUS FOR ENCODING AND USING NETWORK RESOURCE LOCATORS

This is a continuation of application Ser. No. 08/626,601, filed Apr. 2, 1996 now U.S. Pat. No. 5,764,910.

TECHNICAL FIELD OF THE INVENTION

The invention relates to computer networks and, more particularly, to techniques for facilitating the use of network resource locators such as Internet URL's (Universal Resource Locators).

BACKGROUND OF THE INVENTION

Computer networks have long been used by government organizations, educational institutions and corporations for storing, accessing, and exchanging information between computers interconnected by the networks. Originally, the computers interconnected by such networks tended to be large mainframe-type computers. In recent years, however, the falling cost of computers (especially personal computers (PC's)) has put significant computing power and storage into the hands of small businesses and individuals. In fact, some estimates suggest that approximately 30% of homes in the United States now have a personal computer.

The explosive expansion of personal computer usage in private homes has created a need for more extensive computer networks to permit the interconnection and exchange of information between ever growing numbers of computers. An even more significant outgrowth of this expansion is the diversification of the type of information exchanged between computer. Once limited primarily to research information and corporate data, commercial computer networks now carry information related to a wide variety of personal and professional interests. As computer network usage grows, many businesses are recognizing their potential as a communication and advertising medium and are using these computer networks as a medium to reach and communicate with prospective customers.

This growth in the use of computer networks has far exceeded the predictions of most computer industry analysts. One of the largest and fastest growing computer networks is commonly known as the "Internet", a world-wide "network of networks" made up of many thousands of interconnected computers and computer networks. (The name Internet derives from the shortening of "inter-network").

The term "internet" actually has two usages. Without capitalization, it generally refers to any interconnected set of networks (e.g., local area networks (LANs), wide area networks (WANs), etc.). When capitalized, however, (i.e., "Internet") it generally refers to "the" Internet described above.

Internet began as an experiment over 20 years ago by the U.S. Department of Defense, but it has developed into what today is a global resource connecting millions of users. Although the networks that make up the Internet are based on a standard set of protocols (a mutually agreed upon method of communication between parties), the Internet also has gateways to networks and services that are based on other, non-standard protocols.

One of the most common features of the Internet is the exchange of electronic mail (E-mail). Many Internet users print E-mail addresses on their business cards along with their telephone and fax numbers. Any Internet user or any subscriber to most major online networks (e.g., Compuserve (tm), America Online (tm), etc.) can exchange E-mail with any other connected user as long as the one user knows the other user's Internet E-mail address. E-mail messages, however, are limited to textual data only, and may be subject to size restrictions.

Another major feature of the Internet involves a data exchange facility commonly referred to as "FTP" (for "File Transfer Protocol"), the transfer protocol which governs data exchange by which users can exchange binary data with any Internet site that supports FTP. FTP users can download or upload binary files of any size over the Internet, and can browse through file directories on remote FTP sites. Other Internet FTP-related facilities provide the ability to search for information by content, title, topic, etc. FTP sites and files are identifiable by a special Internet address-specifier which identifies the FTP protocol, Internet site and/or file name and location.

In the past few years, an Internet hypertext facility commonly known as the "World Wide Web" (WWW) has become increasingly popular. The WWW facility consists of interlinked hypertext documents, known as "web pages". These documents adhere to a hypertext language called "HTML" (Hyper Text Meta (or Markup) Language) and are processed on the Internet according to a Hypertext Transfer Protocol (HTTP). Any web page can link (i.e, reference or "point to") any other web page anywhere on the Internet. As a result, web pages are spread out all over the Internet. Web pages generally provide a "point and click" style of user interface which requires very little user training. As with FTP data resources (files), web pages are identifiable by a special Internet address (known as a Universal Resource Locator, or URL) which identifies the hypertext protocol (e.g., HTTP) for web pages and the Internet site on which the web page is located. Many WWW sites have a default "home page" or web page which is automatically accessed whenever the site is referenced.

Addresses of resources on the Internet are specified by the URLs which are long character strings composed of a protocol name and an address (or URN—Universal Resource Name), which identifies the host computer in which the resource is stored, and includes the path in the host computer to the requested resource. The accepted format is a string of the form "protocol-name://hostname/path". Occasionally, the protocol may be inferred from operations already being performed. For example, if one is browsing directories on an Internet site for the purpose of downloading, the "ftp://" file transfer protocol is generally assumed. In such cases, many browser programs permit the specification of a resource (e.g., file) by the URN only. Similarly, if one is browsing WWW pages, it may reasonably be assumed that the "http://" hypertext transfer protocol is in use and should be the default protocol unless otherwise specified. Internet E-mail addresses are "strings" having the general format: "username@hostname".

Given the electronic nature of the Internet, these character strings (URLs) are usually referenced in electronic documents or in printed matter, by reproducing the entire string. To access a resource, a user will either copy its associated character string (if the URL string is available electronically) to an application (e.g., a software program) capable of manipulating (using) it, or will manually type it into such an application (if the URL string is printed in a hard copy document).

Evidently, the minimum knowledge necessary to contact another party via E-mail or to send or receive information via the Internet is an Internet address; either an E-mail address or a URL/URN specifying an FTP or WWW resource. Unfortunately, these addresses can be very long and difficult to remember.

By way of example, a particular web page might be specified by a full Internet URL having complete protocol and network location information such as: "http://www.hostcomp.com/pub/indexes/userinfo/ homepage.html".

In this example, "http://" identifies the hypertext protocol (the two forward slashes '//' are a special delimiter used to separate the protocol name from the rest of the URL), "www" refers to the "world wide web", "hostcomp.com" refers to a host computer at a commercial site, "/pub/indexes/userinfo/" identifies a specific directory on the host computer's storage database, and "homepage.html" is a file specifier for a hypertext web page written in HTML. When this URL is given to WWW processing software (i.e., a "Web Browser"), the hypertext web page is retrieved (over the Internet) and executed (displayed to the user). It is beyond the scope of this specification to go into the details of Internet WWW and FTP protocols and information transfer mechanisms. However, those of ordinary skill in the art already understand and appreciate the underlying principles and mechanisms.

Many Internet sites provide services and information to Internet users via WWW, FTP, E-mail, and other mechanisms. Many television and radio news departments, movie studios, research laboratories, universities, manufacturers, vendors and a variety of others have publicly-accessible WWW or FTP sites. It is not uncommon to see or hear a news broadcast refer to an Internet URL by which more information on a story can be obtained. Numerous manufacturers provide technical support and documentation via the Internet, and print their WWW or FTP addresses in their advertisements and literature.

The following terms are used in the description that follows:

End user (or user)—one who is interested in obtaining goods/services, such as by purchase.

Service provider—a provider, such as a vendor, of goods/services.

For the end user, the explosion of Internet URLs and E-mail addresses can be somewhat overwhelming. These addresses must be remembered or written down on a piece of paper, then manually typed into a computer (or other Internet access terminal such as an Internet-capable "smartphone"). This process is cumbersome, error-prone, and can be frustrating for the user. (Generally, a "smartphone" is an enhanced telephone device that possesses some capabilities customarily associated with personal computers, such as a modem to permit data communications to occur over a telephone line, optionally an enhanced (greater than twelve keys) keypad, a display device (such as a liquid crystal display screen) for presenting the user with graphics and text, and the like.)

SUMMARY OF THE INVENTION

Although the foregoing discussion has been directed almost exclusively to accessing and exchanging information via "the" Internet, those of ordinary skill in the art will immediately understand that it applies equally well to other internets (non-capitalized), and that the ensuing description of the invention should be considered as being applicable to the most general set of applications.

It is, therefore, an object of the present invention to provide a technique for accessing inter-network (internet) resources which does not require memorization of long Internet resource specifiers (URLs).

It is a further object of the present invention to provide a technique for accessing inter-network resources without manual entry of a long resource specifier.

It is a further object of the present invention to provide a technique for encoding inter-network resource specifiers into a more compact, compressed form.

It is a further object of the present invention to provide a technique by which a URL can be automatically transmitted by a service provider to an end user so that the end user can access information referred to by the URL without memorization or manual entry of the URL.

According to the invention, a technique is provided by which a "service provider" can facilitate user access to information resources on a computer network. The technique includes creating an encoded network resource locator, storing the locator within the service provider's telephone equipment (e.g., an auto-dial facility of a telephone, or of a computer acting as a telephone) and transmitting the encoded network resource locator (representing data and/or information resources) located on an internet, e.g., the Internet), to a user's telephone/terminal device at a user site during a telephone conversation with the user. The telephone/terminal device at the user site receives and stores the encoded (compacted) resource locator. The encoded network resource locator can then be used by the user to automatically access the data and/or information resources) indicated by the encoded network resource locator.

A system for accomplishing the above includes the aforementioned telephone equipment at the service provider site and the telephone/terminal device at the user site, both having storage associated therewith, a host computer at a network server site and storage associated therewith, and a communications medium (such as a telephone line) for communicating between the telephone equipment and the telephone/terminal device, and between the telephone/terminal device and the host computer.

In preparation for communication with users, the service provider stores information resources (e.g., hypertext pages) on a host computer at a node of a computer network. A network resource locator is compressed into a compact form and the service provider then stores the compressed resource locator into storage associated with his telephone equipment (e.g., in a dialing memory).

During a subsequent telephone conversation with a user, the service provider can transmit the compressed resource locator (e.g., using DTMF tones via an auto-dialer) to the user's telephone/terminal device, which receives and stores the compressed resource locator. The user then has the capability of establishing a data communications session with the host computer on which the desired information is stored, using the compressed resource locator to access it. When such a data communication session is initiated, the user's telephone/terminal device translates the compressed resource locator at least partially back into its unencoded form (e.g, an Internet URL) which is sent to the host computer. The host computer translates any remaining portion of the compressed resource locator which was not unravelled by the user's telephone/terminal device, retrieves the information resource, and transmits it to the user.

According to a feature of the invention, the network resource locator can be compressed by partial tokenization, full tokenization, data compression or other suitable technique. These techniques are described in greater detail hereinbelow.

By providing electronic transmission of the compressed resource locator to the user's telephone/terminal device, the service provider saves the user from having to memorize or manually key in a resource specifier, eliminating considerable potential for error in the process. Generally, this circumvents any need for the user to be aware of the "details" of the resource specifier.

One significant advantage of this technique is that, in its simplest form, no special equipment is required by the service provider. A conventional telephone with dialing memory can be used to store one or more compressed resource locators for transmission to users during telephone conversations.

Other objects, features and advantages of the invention will become apparent in light of the following description thereof.

BRIEF DESCRIPTION OF THE DRAWINGS

Reference will be made to referred embodiments of the invention, examples of which are illustrated in the accompanying drawings. Although the invention will be described in the context of these preferred embodiments, it should be understood that such description is not intended to limit the spirit and scope of the invention to these particular embodiments.

DETAILED DESCRIPTION OF THE INVENTION

Figure 1:
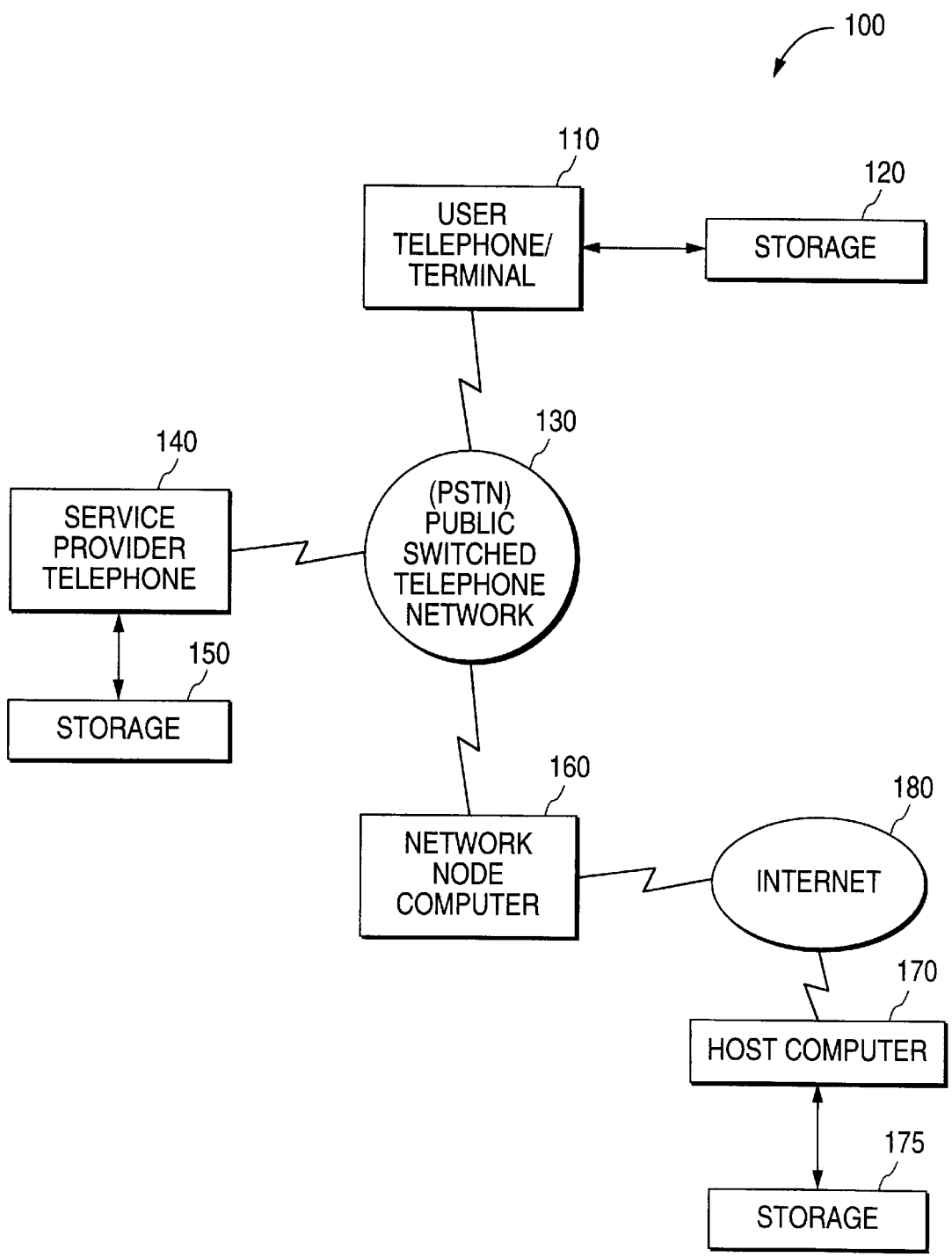
FIG. 1 is a block diagram of a system for encoding and using network resource locators, according to the invention.

The present invention provides a technique by which a service provider can automatically transmit an encoded network resource locator representing data and/or information resources) located on an internet, e.g., the Internet, to a user. The encoded network resource locator can then be used by the user to automatically access the data and/or information resources) indicated by the encoded network resource locator.

In order to enhance its accessibility to prospective customers, a service provider (such as a store) may wish to place its hypertext documents(), or object(s), and/or other information object(s) on a computer network such as the Internet. In order to accomplish this using conventional mechanisms' the service provider must store the information object(s) on a host computer (also occasionally referred to as a "network server" or just "server") capable of accepting and serving user requests (using designated protocols such as HTTP) for uploading such information objects. Once the information object(s) is(are) placed in the host computer's storage, a resource locator (e.g., URL) can be generated (based on the host name, the path to the object, etc.) which identifies the network location of the object. This resource locator, can be passed on by the service provider to those users having an interest in accessing the object(s). However, the resource locator may be long, cryptic and, therefore, easily forgotten, confused, or mistyped by the user.

The present invention overcomes this problem by electronically transmitting the resource locator from the service provider to the user. Accordingly, the user need not memorize, type or take any action to store the resource locator into his telephone/terminal device for use in accessing the object(s), except as explained below. Thus, a key feature of the invention is the manner with which the resource locator is made available to the user with minimal, if any, action on his part being required.

Furthermore, in order to simplify the service provider's task, it is advantageous to make it possible for the resource locator to be stored and transmitted by nothing more than the keypad of a touch-tone* telephone. This, in turn, requires modifying the resource locator so that the standard keypad can generate all of the symbols and characters of which it is constituted. Moreover, compressing the resource locator is also beneficial. A technique is utilized, as explained below, for compressing the resource locator into a compact form which is electronically and automatically transmitted to a user's telephone/terminal device. The user's telephone/terminal device receives and stores the compressed resource locator for subsequent use in accessing the information object(s).

Using the inventive technique, the service provider stores the information objects on a host computer in the conventional fashion. Unlike prior-art techniques, however, the service provider also stores the compact form of the resource locator for transmission to users. This can be as simple as storing the compressed resource locator as an auto-dial sequence in a conventional telephone with quick-dial capability. The service provider needs only to press an auto-dial button (or button sequence) to transmit the compacted resource locator to a user. Various other schemes can also be used to transmit the resource locator from the service provider's telephone equipment to the user's telephone/terminal device. For example, the compression of the resource locator is not essential, although its use is clearly advantageous. Also, rather than using the DTMF tones of the service provider's telephone equipment, the service provider's site can be equipped with a modem as part of a PC, for example, to store and transmit the resource locator. No details are deemed necessary since the specifics are readily apparent to anyone with ordinary skill in the art.

Switching of the user's telephone/terminal device from a telephone conversation with the service provider to a data session wherein the information object is retrieved may take place immediately, or at a later time—either upon termination of the call (i.e., when the call is disconnected), or at a later time selected by the user (i.e., by adding the received URL to the user's local directory/storage). It is also possible for the user, given the appropriate communication line (e.g., ISDN) and/or communication technique (e.g., multiplexing), to continue the telephone session while simultaneously proceeding with the data session, both to obtain the resource locator from the service provider and then to retrieve and display the information object.

As is well known to those of ordinary skill in the art, internet sites with servers compose the underlying structure of the World Wide Web on the Internet today. This structure requires no changes for the purposes of the present invention. However, in order to use a shorter, compressed notation for URL's, it may be required that translation of the compressed notation be supported by the host computer. An alternative is to provide for such translation by the user's telephone/terminal device which then sends a normal URL to the host computer.

FIG. 1 is a block diagram of a system 100 for encoding and using network resource locators in the manner described above. At a user site, a user has a telephone/terminal device 110 with capabilities for conducting data and voice communications. This telephone/terminal device 110 can be an integrated device, such as a "smartphone" or a suitably equipped personal computer, or it can be a pair of suitably interconnected separate devices (e.g., separate telephone and data device sharing a telephone line, where the data device is capable of monitoring the telephone line for data signals during a telephone conversation.). The telephone/terminal device 110 has the capability of receiving an encoded network resource locator (e.g., compressed URL). A storage medium 120 (e.g., disk drive or other storage medium) is connected to (or integrated within) the telephone/terminal 110. Received network resource locators, such as Internet URL's can be stored and accessed by the telephone/terminal device 110 from the storage medium 120.

The telephone/terminal device 110 establishes voice and/or data connections via a communications medium 130, such as the public switched telephone network (PSTN) or another suitable communications medium. At a service provider site, a service provider has a telephone 140 for communicating with users via the communications medium 130 (e.g., PSTN). Attached to (or integrated within) the service provider telephone 140 is a storage medium 150, for storing one or more network resource locators for transmission to a user telephone/terminal (e.g., 110).

The network resource locators are stored in the storage medium 150 at the service provider site in a compressed form, (e.g., a numerical form). The service provider telephone 140 has means, (e.g., quick-dial capability or other similar capability) for storing and transmitting a signal representing the encoded network resource locator. In the case of a quick-dial telephone feature, the network resource locator would be encoded into a numeric-only form and stored in the service providers telephone in the same manner as a telephone number.

At a network server site, a network node computer 160 is connected to the communications medium 130 for communicating with users. The network node computer 160 is further connected to a computer network 180 (e.g., "Internet"), and is used in a conventional, well known fashion to "get on" the network.

In preparation for subsequent communication with users, the service provider stores information (e.g., hypertext pages) on host computer 170 with a storage medium 175 at a (e.g., his subscribed-to) network server site. The stored information has a network resource locator (e.g., URL). The service provider derives an encoded version of the URL (in a manner described below), and then programs his service provider telephone with the encoded network resource locator.

In order to explain the encoding, the following URL is presented as an example:

http://www.nsc.com/patents/index.html
This URL can be encoded as follows:
http → 04 (other access methods, or -continued protocols, can be assigned different
two digit numbers, such as 01 for ftp)
www.nsc.com. → 139.187.253.17 (a 32 bit internet
                          IP address)
patents/index.html → an encoded number or a
                         number that can be used
                         for a look-up table
                         stored in the host
                         computer.

In accordance with one approach, the user's telephone/terminal device 110 is provided with the capability of translating the compressed URL in its entirety. Thus, what would be transmitted by device 110 to the host computer is a normal URL. One advantage of such an approach is that the user can display the URL so that the information it contains can be readily discerned. Another advantage is that no modifications are required to any information stored on the network, other than the resource of interest which, of course, must be stored on storage medium 175 of host computer 170.

Another approach is to utilize the device 110 to interpret the compressed protocol and hostname information, but not the path on the host computer to the resource stored therein. The compressed path is received by the host computer 170 which must be provided with a suitable decompression algorithm or a look-up table. The look-up table would be for translating from an encoded (compressed) network resource locator into a full specification (e.g., network resource address such as a full Internet URL) for an associated network resource. Additional details about encoding techniques are provided below under the heading "Encoding Network Resource Locators".

If, during a subsequent telephone conversation between the service provider and a user, the user expresses an interest in accessing the information stored by the service provider, the service provider uses the transmission capability of the service provider telephone 140 (e.g., quick-dial or other transmission scheme) to transmit the encoded network resource locator to the user. The user's telephone/terminal device 110 receives and stores the encoded network resource locator onto its associated storage medium 120. At any time thereafter, the user can connect to the network computer 160, get on the network and transmit the network resource locator to host computer 170 in the form of an information request. The host computer 170 uses a received normal network resource locator or translates the encoded network resource locator into a full network resource locator, depending on which of the above-described approaches is used, and retrieves the associated information. The host computer 170 then transmits the retrieved information back to the user's telephone/terminal device 110, where it is displayed.

Those of ordinary skill in the art will immediately recognize that network topologies other than the one shown in FIG. 1 may be employed to perform the same function. It is intended that FIG. 1 be considered as being merely representative of any suitable network topology. It is fully within the intended spirit and scope of the present invention to apply the present inventive techniques to the broadest possible set of computer networks. Therefore, the connection between the user's telephone/terminal device 110 and the host computer 170 shown in FIG. 1 may be considered to be essentially equivalent to a data communications connection between the user telephone/terminal device 110 and any accessible node of a computer network.

Encoding Network Resource Locators

A wide variety of techniques can be employed to encode a network resource locator into a short, encoded form. One such technique partially "tokenizes" frequently-used character sequences, such as "http://", "ftp://", ".edu", ".com", etc., into a compact form (e.g., a numeric token), and replaces the plain text character sequences of the resource locator with the token. Additionally, the host computer for the site specified in the network resource locator can be referred to by a numerical address. For example, on the Internet, any site computer has a 32-bit IP (Internet Protocol) address. This IP address can be specified as decimal text, hexadecimal text, or as a 32-bit binary number, and encoded into the resource locator instead of a textual form of the IP address which usually occurs in URL's. It is within the capabilities of Internet's access protocols to address and connect to sites in this manner. Those of ordinary skill in the art will immediately appreciate that this technique has applicability to a more general set of inter-networks, beyond Internet. It is within the spirit and scope of the present invention to apply the inventive techniques to any suitable network and addressing scheme.

Another technique for encoding an Internet URL or other network resource locator into a compact, encoded form is to fully-tokenize (digitally compress) the network resource locator by any suitable technique (e.g., Huffman coding, tokenization of frequently used character sequences, etc.).

Yet another technique for encoding an Internet URL or other network resource locator into a compact, encoded form is to represent the host computer's network node address in numerical form (as specified above), and to append to it a numeric (or otherwise encoded) resource specifier in a form mutually acceptable to the owner of the host computer 170 and the service provider. The user's terminal/telephone device 110 uses the network node address portion of the encoded network resource locator to connect to the host computer 170. The host computer 170 locates the desired information by translating the encoded resource specifier portion into a full network resource locator using its local translation table.

Service Provider

Figure 2:
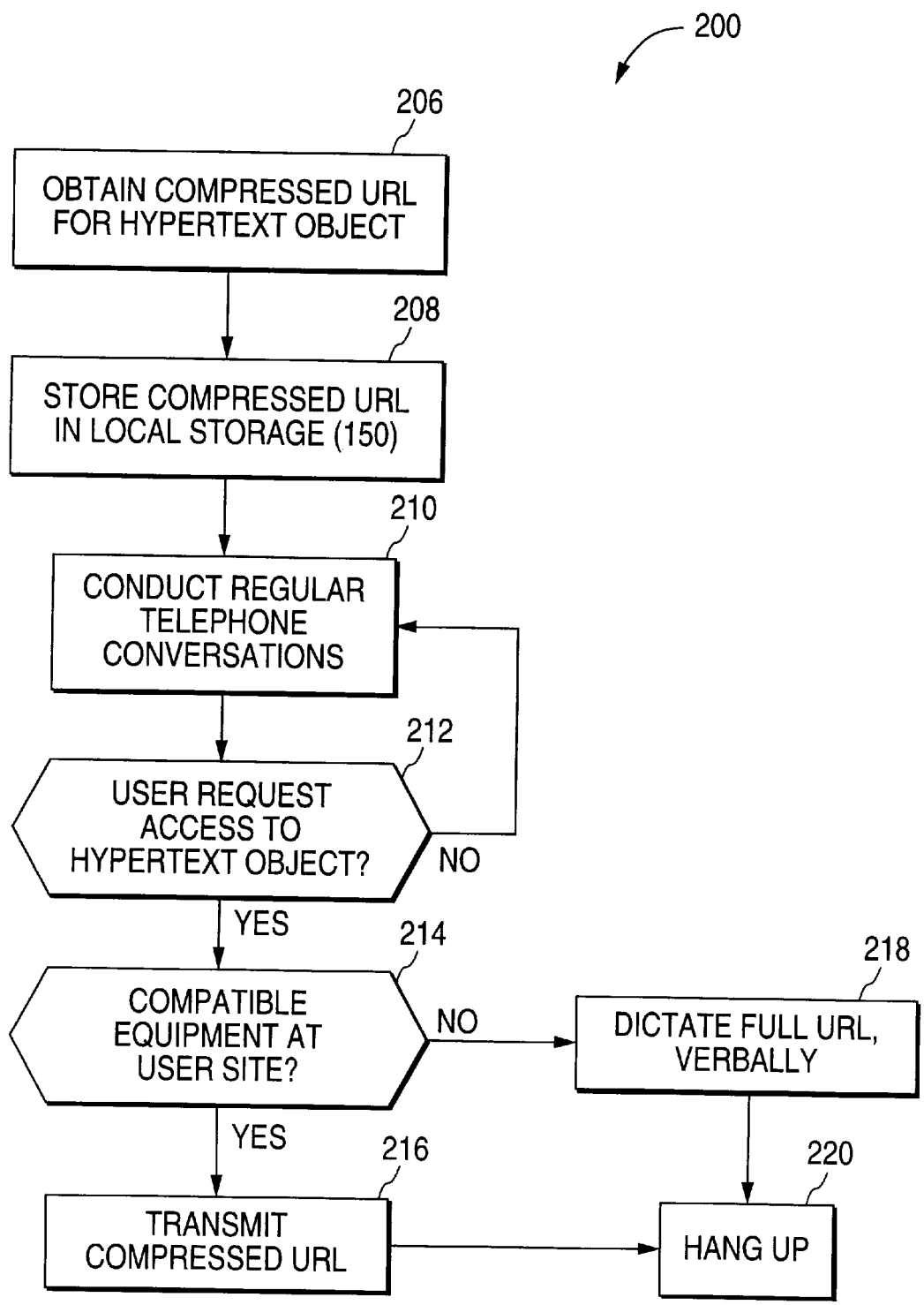
FIG. 2 is a flow diagram showing steps to be performed at a service provider site in encoding and using network resource locators, according to the invention.

FIG. 2 is a flow diagram 200 showing steps to be performed at a service provider site in encoding and using network resource locators, as discussed hereinabove.

In step 206, a compressed form (e.g, tokenized, numeric) of a network resource locator is obtained. The compressed URL is generated in a manner described below as step 404 of FIG. 4. With step 406, the compressed URL is outputted by the host computer and step 206 is the receipt of that signal by the service provider. In a next step 208, the compressed network resource locator is stored in the local storage medium (150) associated with the service provider's telephone. The steps 206 and 208 are preliminary to the service provider conducting communication sessions with users.

Next, in a step 210, the service provider conducts a normal telephone conversation with a user. If, during the course of the conversation, it is determined (step 212) from the user that access to an information object is desired, in a next step 214 the service provider determines verbally whether the user has a compatible telephone/terminal device (see, e.g., 110) at his location. If so, in a next step 216 the service provider transmits the compressed network resource locator to the user electronically. This can be accomplished using DTMF (dual-tone-multi-frequency) telephone dialing tones, in which case the service provider requires no special equipment other than a telephone with quick-dial (number storage) capability. Of course, as explained above, other techniques to effect transmission of the resource locator can also be used. If the user does not have a compatible telephone/terminal device, then in step 218 the service provider dictates the full network resource locator for the information object (e.g., an Internet URL) to the user. Finally, in a step 220, the service provider hangs up, ending the conversation. Although not shown, the user might also initiate a data communication session before the service provider hangs up so that the object can be retrieved and displayed while the telephone conversation with the service provider continues.

User

Figure 3:
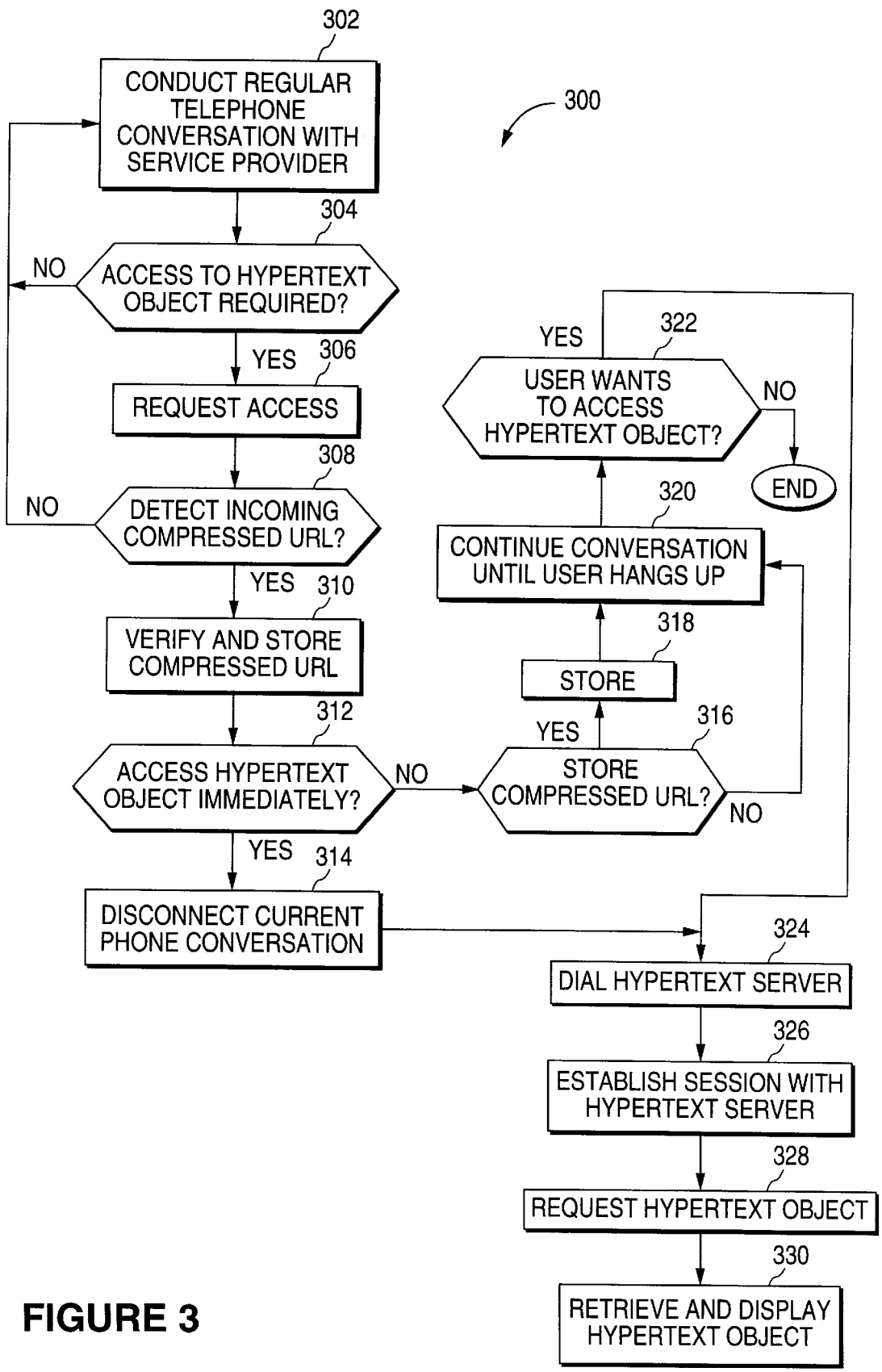
FIG. 3 is a flow diagram showing steps to be performed at a user site in encoding and using network resource locators, according to the invention.

FIG. 3 is a flow diagram 300 showing steps to be performed at a user site in using network resource locators, according to the invention. In a first step, 302, the user converses with a service provider. In a next step 304, if the user determines that he would like to access information from the service provider, he requests access (step 306) from the service provider. Next (step 308), the user waits until his telephone/terminal device (110) detects and receives a compressed resource locator from the service provider. Then (step 310) the compressed resource locator is verified by, for instance, using redundant checksum digits, and then stored. The verification done by step 310 can be considered optional.

If the user desires immediate access to the information (step 312), the telephone conversation is ended (step 314) and the process proceeds to a step 324, described hereinbelow. Although not shown, immediate access is also possible without ending the conversation, as explained above. If the user does not require immediate access to the information, the conversation continues, and the user decides (step 316) whether or not to store the compressed resource locator (step 318) for later use in accessing the information. (The step 316 is optional, it generally being fair to assume that by requesting access (step 306) the user wishes to store the compressed URL.) The user then continues the conversation (step 320) until he is done. Next (step 322), if the user does not wish to access the information at that time, the process ends. Otherwise, the process continues (step 324) by dialing a network server computer to get on the network and establish a data communication session with the host computer (step 326). The user requests the information from the host computer (step 328) by causing his telephone/terminal device to transmit the resource locator. The host computer retrieves and transmits the information object to the user's telephone/terminal device which receives and displays it (step 330).

Step 324 can accommodate both of the above-described approaches, namely by translating the compressed URL and transmitting a normal URL, or transmitting a compressed URL which then must be translated by the host computer 170.

Network Server

Figure 4:
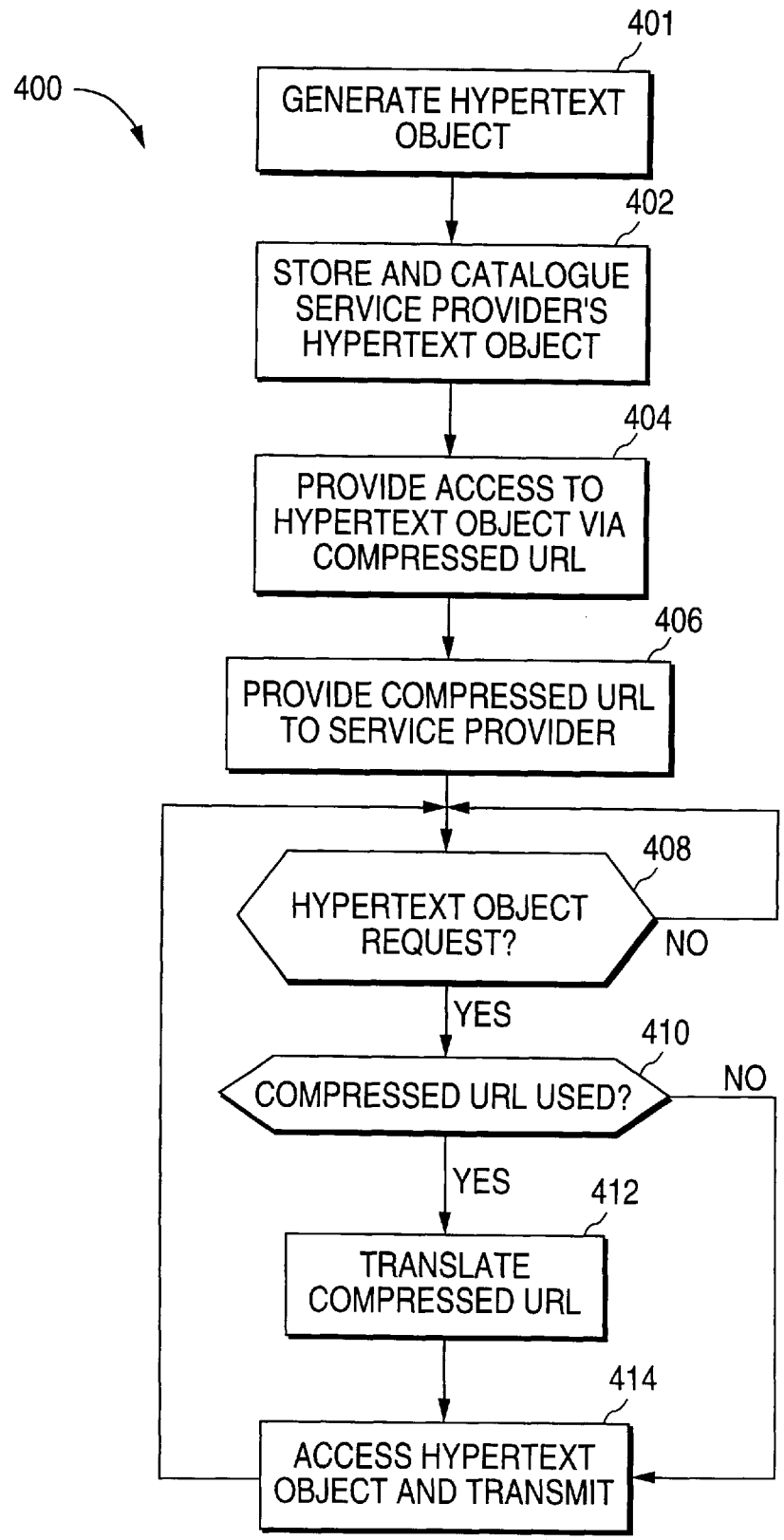
FIG. 4 is a flow diagram showing steps to be performed at a network server site in encoding and using network resource locators, according to the invention.

FIG. 4 is a flow diagram 400 showing steps to be performed at the host computer in encoding and using network resource locators. In a first step 401, carried out before being contacted by a user, the service provider generates an information object, such as a hypertext page, to be stored on a computer network. The service provider's information object (e.g., hypertext page) is stored and cataloged (step 402) on the host computer. In a next step 404, access to the information object is provided for by creating a translation between a compressed resource locator and the network resource location of the information object. Of course, step 404 is required only with the above-described approach in which the user's telephone/terminal device 110 does not fully translate the compressed URL and, thus, sends to the host computer what is not a normal URL. The translation being provided for in the host computer is either a look-up table or a decoding algorithm.

In a next step 406, the compressed resource locator is provided to the service provider for transmission to users, so that users may then access the information object using the compressed resource locator. The host computer then waits until a user requests access to the information object (step 408). When access is requested, the host computer determines whether or not the compressed resource locator is being used (step 410) to access the object. If the compressed resource locator is used, it is translated (step 412) into a full (decoded) network resource locator for the information object. If the compressed form is not used, then the full network resource locator made available by step 408 (specified by user to Access the information object) is used. Finally, (step 414) the full network resource locator is used by the host computer to retrieve and transmit the information object to the user's telephone/terminal device.

Order of Actions

Figure 5:
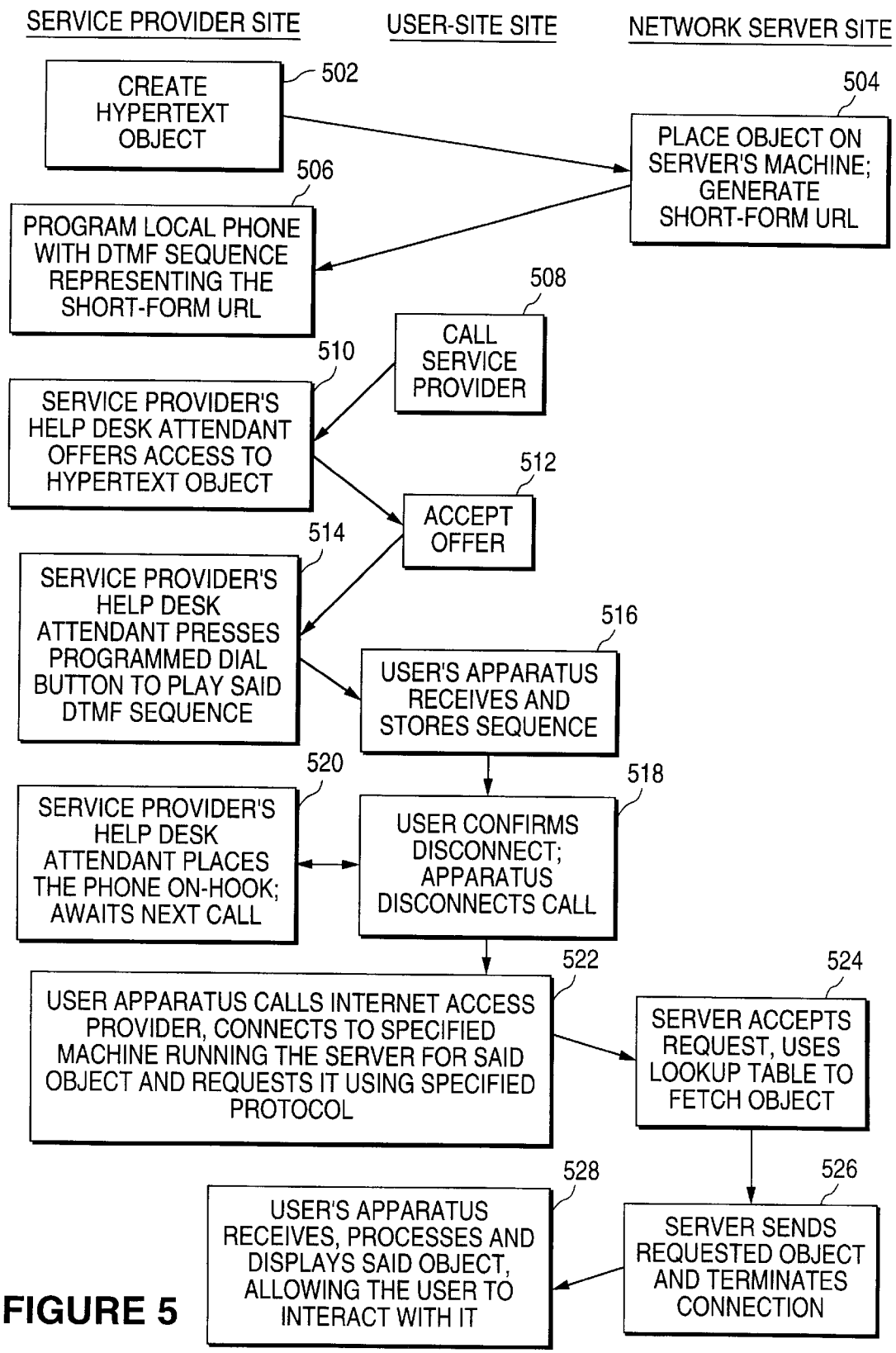
FIG. 5 is a flow diagram showing the order of actions to be performed at a service provider site, user site, and network server site in encoding and using network resource locators, according to the invention.

FIG. 5 is a flow diagram, generally arranged in three "columns", showing the order of actions to be performed at a service provider site (steps 502, 506, 510, 514, 520; compare FIG. 2), at a user site (steps 508, 512, 516, 518, 522, 528; compare FIG. 3), and at a network server site (steps 504, 524, 526; compare FIG. 4) in encoding and using network resource locators, according to the invention. The relationship of steps depicted in FIG. 5 to corresponding steps depicted in FIGS. 2, 3 and 4 will be self-evident.

In a first step 502, an information object (e.g., hypertext object) is created by a service provider. In a next step 504, the information object is placed on a host computer and a short-form (compressed) resource locator is generated. In a next step 506, the service provider programs his local telephone equipment (or transmission device) with the short-form resource locator. The system (i.e., service provider/network) is now ready to accept user requests.

A user contacts the service provider (step 508), using his telephone/terminal device. The service provider (e.g., a help desk attendant) offers access to the information object (step 510). The user accepts the offer (step 512) and indicates that he has equipment capable of electronically receiving a transmission by the service provider of the resource locator. The service provider transmits the compressed resource locator to the user's telephone/terminal device (step 514). The user's telephone/terminal device receives and stores the compressed resource locator from the service provider (step 516).

The user may then terminate the call to the service provider (step 518). The service provider also terminates the call (step 520). The user may then connect to the host computer (step 522) e.g., by an Internet connection, requesting access to the information object using the compressed resource locator received from the service provider. The host computer receives and accepts the request (step 524) and uses its resident translation table (lookup table) to translate the compressed resource locator into a full network resource locator (e.g., Internet URL) and retrieves the information object. Of course, no lookup functionality is required if a normal URL is received, as explained above. The host computer transmits the information object to the user (step 526). The user's telephone/terminal device receives, processes and displays the information object (step 528).

The following patents, incorporated by reference herein, are cited as being representative of related prior art:

U.S. Pat. No. 5.388.154 describes an alphabetic telephone apparatus for encoding alphabetic characters as a sequence of DTMF or pulse dialing signals. A separate alphabetic keyboard is used for alphabetic character entry.

U.S. Pat. No. 5,339.358 described a technique for using a standard push button keypad to encode alphabetic or alphanumeric sequences into DTMF tones.

U.S. Pat. No. 5.392,338 describes a technique for typing alphabetic or alphanumeric character sequences using a conventional touch tone (DTMF) telephone.

All of these patents are directed to techniques for transmitting alphanumeric information using DTMF tones. By way of contrast, the present invention does not attempt to transmit any form of alphanumeric information. The present inventive technique determines a suitable encoding of a compressed resource locator. If the resource locator is to be transmitted by DTMF encoding, which has a native numeric signalling scheme, the resource locator is encoded entirely as a sequence of numerals, and is interpreted at both the transmitting and receiving ends as such.

The above and other objects, features, advantages and embodiments of the invention, including other (i.e., additional) embodiments of the techniques discussed above may become apparent to one having ordinary skill in the art to which this invention most nearly pertains, and such other and additional embodiments are intended to fall within the spirit and scope of the present invention, as defined by the following claims.

What is claimed is:

1. A method of accessing an information resource on a computer network, comprising:

storing an information resource on a host computer at a node of a computer network and providing a resource specifier string representing a full network resource locator for the information resource;

providing a set of uniquely identifiable tokens for representing specific character sequences, each token representing a specific character sequence;

creating a compressed resource locator by replacing character sequences in the resource specifier string with corresponding tokens representing those character sequences;

providing the compressed resource locator to a storage medium of a transmission unit of a telephone device at a service provider site for subsequent transmission;

transmitting the compressed resource locator from the telephone device to a user's telephone/terminal device at a user site;

establishing a data communication session over the computer network between the user telephone/terminal device and the host computer;

in response to the compressed resource locator, requesting the information resource from the host computer by transmitting a signal related to the compressed resource locator from the user's telephone/terminal device to the host computer; and at the host computer, using said signal to retrieve the information resource and to transmit it over the computer network to the user's telephone/terminal device.

2. A method according to claim 1, wherein: one or more tokens are provided for representing a protocol-name portion of the resource specifier string.

3. A method according to claim 1, wherein:

one or more tokens are provided for representing commonly-occurring sequences of characters of the resource specifier string.

4. A method according to claim 1, further comprising:

encoding a network site identification into the compressed resource locator as a numerical host ID.

5. A method according to claim 1, further comprising:

encoding a resource identifier into the compressed resource locator as a numerical resource ID.

6. A method according to claim 1, further comprising the step of decoding the compressed resource locator at the user's telephone/terminal device so that said signal is the full network resource locator.

7. A system for accessing a network data resource, comprising:

Means for providing a compressed resource locator representing a full network resource address of an information object stored on a host computer at a node of a computer network;

a telephone device at a service provider site having a storage medium for storing the compressed resource locator, and a signalling unit for transmitting the compressed resource locator; and a telephone/terminal device at a user location for establishing voice communication with the service provider telephone device, for receiving and storing the compressed resource locator transmitted by the service provider telephone device, and for establishing communication with the host computer over the computer network based on the compressed resource locator wherein the user's telephone/terminal device includes a decoder for decoding at least a portion of the compressed resource locator; and wherein the host computer includes a translator for decoding a portion of the compressed resource locator not decoded by the decoder in the user's telephone/terminal device.

8. A system according to claim 7, wherein: the compressed resource locator is stored as a sequence of numeric digits.

9. A system according to claim 7, wherein:

the compressed resource locator is encoded in a partially-tokenized format.

10. A system according to claim 7, wherein:

the compressed resource locator is encoded in a fully-tokenized format.

11. A system according to claim 7, wherein:

the compressed resource locator is encoded in a format which includes a numerical network site identifier.

12. A system according to claim 7, wherein:

the compressed resource locator is encoded in a format which includes a numerical resource identifier.

13. A method of accessing an information resource on a computer network, comprising:

storing an information resource on a host computer at a node of a computer network and providing a resource specifier string representing a network resource locator for the information resource;

providing the resource locator to a storage medium of a transmission unit of a telephone device at a service provider site for subsequent transmission;

transmitting the resource locator from the telephone device to a user's telephone/terminal device at a user's site;

establishing a data communication session over the computer network between the user's telephone/terminal device and the host computer;

requesting the information resource from the host computer by transmitting the resource locator from the user's telephone/terminal device to the host computer; and at the host computer, using said resource locator to retrieve the information resource and to transmit it to the user's telephone/terminal device wherein said method further comprising any of the following:

wherein said step of transmitting the resource locator is preceded by initiation of a telephone conversation between the user and the service provider during which the user expresses an interest in receiving said information resource;

wherein said step of transmitting the resource locator occurs after the telephone conversation is concluded;

wherein said steps of establishing a data communications session, requesting the information resource and retrieving the information resource occur during the telephone conversation;

wherein said steps of establishing a data communications session, requesting the information resource and retrieving the information resource occur after the telephone conversation is concluded; and wherein said steps of establishing a data communications session requesting the information resource and retrieving the information resource occur after the telephone conversation id concluded.

14. A system for accessing a network data resource, comprising:

means for providing a compressed resource locator representing a network resource address of an information object stored on a host computer at a node of a computer network;

a telephone device at a service provider site having a storage medium for storing the compressed resource locator and a signalling unit for transmitting the resource locator;

a telephone/ terminal device at a user location for establishing voice communication with the service provider telephone device, for receiving and storing the compressed resource locator transmitted by the service provider telephone device, and for establishing communication with the host computer over the computer network based on the resource locator; and a decoder for decoding the compressed resource locator at said telephone/terminal device so that said network resource address is presented at said user location.

* * * * *

UNITED STATES PATENT AND TRADEMARK OFFICE
CERTIFICATE OF CORRECTION

PATENT NO.    : 6,081,842
DATED         : June 27, 2000
INVENTOR(S)   : Yuval Shachar It is certified that error appears in the above-identified patent and that said Letters Patent is hereby corrected as shown below:

Column 12,
Line 50, delete -- in response to the compressed resource locating, --.

Signed and Sealed this

Twenty-fifth Day of September, 2001

Attest:

*Attesting Officer*

NICHOLAS P. GODICI
*Acting Director of the United States Patent and Trademark Office*